(12) United States Patent
Guo et al.

(10) Patent No.: US 12,222,326 B2
(45) Date of Patent: Feb. 11, 2025

(54) MATERIAL TESTING MACHINE

(71) Applicant: Tsinghua University, Beijing (CN)

(72) Inventors: Fei Guo, Beijing (CN); Ganlin Cheng, Beijing (CN); Bingzhe Chen, Beijing (CN); Chong Xiang, Beijing (CN); Yijie Huang, Beijing (CN); Shengshan Chen, Beijing (CN); Yongjian Li, Beijing (CN); Xiaohong Jia, Beijing (CN); Yuming Wang, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 449 days.

(21) Appl. No.: 17/868,741

(22) Filed: Jul. 19, 2022

(65) Prior Publication Data

US 2023/0366796 A1  Nov. 16, 2023

(30) Foreign Application Priority Data

May 10, 2022  (CN) .......................... 202210504532.3

(51) Int. Cl.
*G01N 3/04* (2006.01)
*G01N 3/30* (2006.01)
*G01N 3/40* (2006.01)
*G01N 3/56* (2006.01)
*G01N 19/02* (2006.01)

(52) U.S. Cl.
CPC ................. *G01N 3/04* (2013.01); *G01N 3/30* (2013.01); *G01N 3/405* (2013.01); *G01N 3/56* (2013.01); *G01N 19/02* (2013.01); *G01N 2203/0206* (2013.01); *G01N 2203/0658* (2013.01)

(58) Field of Classification Search
CPC   G01N 3/04; G01N 3/30; G01N 3/405; G01N 3/56; G01N 3/02; G01N 2203/0206; G01N 2203/0658; G01N 19/02
See application file for complete search history.

(56) References Cited

FOREIGN PATENT DOCUMENTS

| CN | 106442106 A | 2/2017 |
|----|-------------|--------|
| CN | 110274874 B | 4/2022 |
| EP | 3795978 A1  | 3/2021 |

*Primary Examiner* — Jonathan M Dunlap
(74) *Attorney, Agent, or Firm* — KILPATRICK TOWNSEND & STOCKTON LLP (57) ABSTRACT

A material testing machine, including a machine body, a first fixing element, a second fixing element and a detection assembly; the first and the second fixing elements are mounted to the machine body, the first fixing element is configured to mount a first testing element, and the second fixing element is configured to mount a second testing element; in a first state, the first and the second testing elements are in sliding contact; in a second state, the first fixing element drives the first testing element to collide with the second testing element; the detection assembly is configured to detect a target parameter, and in the first state, the target parameter includes a friction force and/or, a friction sound between the first and the second testing elements; and in the second state, the target parameter includes a collision force received by the first or the second testing element.

18 Claims, 8 Drawing Sheets

MATERIAL TESTING MACHINE

CROSS-REFERENCE TO RELATED APPLICATION

This application claims priority to Chinese Patent Application No. 202210504532.3, filed on May 10, 2022, which is hereby incorporated by reference in its entirety.

TECHNICAL FIELD

The present application relates to the technical field of material testing, and in particular to a material testing machine.

BACKGROUND

Materials are the material basis for industrial production, and high-quality materials are the basic guarantee and prerequisite for producing high-quality products. Testing the materials can provide material manufacturers with rational scientific support for researching and developing new materials, improving material quality, maximizing the potential of materials, and analyzing failures in preparation of workpieces from the materials.

According to the different properties of materials, tests on the materials are also divided into many types. For example, during opening and closing process of a valve, a surface of a seal in the valve will produce frictional wear or collision damage due to mutual contact, thereby affecting an overall sealing effect of the valve. Therefore, it is usually necessary to conduct, for example, frictional wear test and collision test on the seal.

However, tests for different material usually need to be completed using different testing equipment, and these testing equipment have a relatively single function and low testing efficiency.

SUMMARY

Embodiments of the present application provide a material testing machine to solve the problem that a material testing equipment has relatively single function and low testing efficiency.

The material testing machine provided in the embodiments of the present application includes: a machine body, a first fixing element, a second fixing element and a detection assembly;

both the first fixing element and the second fixing element are mounted to the machine body, the first fixing element is configured to install a first testing element, and the second fixing element is configured to install a second testing element; when the first fixing element and the second fixing element are in a first state, the first testing element is in sliding contact with the second testing element; when the first fixing element and the second fixing element are in a second state, the first fixing element drives the first testing element to collide with the second testing element; and the detection assembly is configured to detect a target parameter, and when the first fixing element and the second fixing element are in the first state, the target parameter includes a friction force between the first testing element and the second testing element, and/or, a friction sound generated due to the sliding contact between the first testing element and the second testing element; when the first fixing element and the second fixing element are in the second state, the target parameter includes a collision force received by the first testing element or the second testing element.

By adopting the above-mentioned technical solution, the first fixing element is utilized to fix the first testing element, and the second fixing element is utilized to fix the second testing element; when the first fixing element and the second fixing element are in the first state, the first testing element is in sliding contact with the second testing element, and the detection assembly detects the friction force and/or the friction sound between the first testing element and the second testing element, so as to conduct a material friction test; when the first fixing element and the second fixing element are in the second state, the detection assembly detects the collision force received by the first testing element or the second testing element, so as to conduct a material collision test, thereby solving the problem that a material testing equipment has relatively single function and low testing efficiency.

It is further configured that the machine body is provided with a connecting seat, the connecting seat is slidably arranged on the machine body along a first direction, the first fixing element is slidably arranged on the connecting seat along a second direction, the second direction is perpendicular to the first direction, and the connecting seat is provided with a collision device; the second fixing element is slidably arranged on the machine body along the second direction, and the machine body is provided with a vibration element;

when the first fixing element and the second fixing element are in the first state, the connecting seat is located at a first position and fixed relative to the machine body; in the second direction, the vibration element drives the second fixing element to vibrate, so as to drive the first fixing element to slide on the connecting seat along the second direction; and when the first fixing element and the second fixing element are in the second state, the second fixing element is fixed relative to the machine body; the connecting seat is located at the second position and fixed relative to the machine body, in the first direction, there is a gap between the first testing element and the second testing element, and the collision device drives the first fixing element to move along the first direction so that the first testing element collides with the second testing element.

It is further configured that the detection assembly includes a friction force sensor, a sound sensor and a pressure sensor;

the friction force sensor is mounted to the connecting seat and is in sliding contact with the first fixing element, so as to detect a friction force between the first testing element and the second testing element;

the sound sensor is mounted to the machine body; and the pressure sensor is mounted to the connecting seat and is configured to detect a pressure on the first fixing element in the first direction.

It is further configured that the detection assembly further includes a vibration sensor and/or a travel sensor;

when the first fixing element and the second fixing element are in the first state, the vibration sensor is configured to detect a vibration frequency and a vibration amplitude of the second fixing element; the travel sensor is configured to detect a vibration displacement of the second fixing element in the second direction.

It is further configured that the collision device includes a mounting seat, a sliding column and a mounting substrate, the mounting substrate is mounted to the connecting seat, and the mounting seat is connected to the mounting substrate, the sliding column is connected to the first fixing element; and when the sliding column is in the first state, the sliding column is fixed with the mounting seat; when the sliding column is in the second state, the sliding column slides on the mounting seat along the first direction, so that the first testing element is driven by the first fixing element to collide with the second testing element.

It is further configured that the collision device further includes an adjustment assembly, the adjustment assembly includes a first elastic element and a drive element, the drive element is mounted to the mounting substrate and has a piston rod, a first end of the first elastic element is connected to the sliding column, a second end of the first elastic element is connected to the piston rod of the drive element, and a telescopic direction of the first elastic element is the first direction; and when the sliding column is in the first state, the drive element drives the first elastic element to perform compression.

It is further configured that the collision device further includes a rebound assembly, and the rebound assembly includes a rebound element and a second elastic element;

the rebound element is connected to the piston rod of the drive element, and is slidably arranged on the mounting seat along the first direction, and the first rebound element is connected to the rebound element; and a first end of the second elastic element is connected to the mounting substrate, a second end of the second elastic element is connected to the rebound element, and a telescopic direction of the second elastic element is the first direction.

It is further configured that the mounting seat is provided with a sliding groove and a fixing groove, which are communicated with each other; the sliding groove extends along the first direction, and an included angle is formed between an extending direction of the fixing groove and the first direction; and the sliding column is provided with a control head, and when the sliding column is in the first state, the control head is snapped in the fixing groove, and when the sliding column is in the second state, the sliding column slides in the sliding groove along the first direction.

It is further configured that the machine body is provided with a moving device, and the moving device includes a moving screw and a power element;

the moving screw extends along the first direction, and is rotatably mounted to the machine body around the first direction, and the connecting seat is threaded to the moving screw; the power element is mounted to the machine body, and is configured to drive the moving screw to rotate.

It is further configured that the first fixing element includes a first fixing portion, a first clamping plate, a second clamping plate and a driving screw;

the first clamping plate is fixedly mounted to the first fixing portion, the second clamping plate is arranged opposite to the first clamping plate, and is slidably mounted to the first fixing portion along a direction close to or away from the first clamping plate; the driving screw is threaded to the first fixing portion, and the driving screw is rotatably connected to the second clamping plate;

and/or the second fixing element includes a second fixing portion, a first chuck, a second chuck and a fixing screw;

the first chuck is fixedly mounted to the second fixing portion, the second chuck is arranged opposite to the first chuck, and is slidably mounted to the second fixing portion along a direction close to or away from the first chuck, and the fixing screw is threaded to the second fixing portion, and abuts against the second chuck tightly.

BRIEF DESCRIPTION OF DRAWINGS

The accompanying drawings, which are incorporated in and constitute a part of this description, illustrate embodiments consistent with the present application and are used together with the description to explain the principles of the present application.

DESCRIPTION OF REFERENCE NUMBERS 1. machine body; 11. mounting frame; 111. limiting rod; 12. moving device; 121. power element; 122. moving screw; 123. sliding rod; 13. connecting seat; 14. vibration element; 141. vibration shaft; 1411. connecting block; 2. first fixing element; 21. first fixing portion; 22. first clamping plate; 221. first clamping block; 23. second clamping plate; 231. second clamping block; 24. driving screw; 3. second fixing element; 31. the second fixing portion; 311. guiding portion; 32. first chuck; 33. second chuck; 331. guiding rod; 34. fixing screw; 4. detection assembly; 41. friction force sensor; 42. sound sensor; 43. pressure sensor; 44. vibration sensor; 45. travel sensor; 451. detection rod; 5. collision device; 51. mounting substrate; 52. mounting seat; 521. fixing groove; 522. sliding groove; 53. sliding column; 531. control head; 54. adjusting assembly; 541. first elastic element; 542. drive element; 55. rebound assembly; 551. rebound element; 552. second elastic element; 6. first testing element; and 7. second testing element Specific embodiments of the present application have been shown by the above-mentioned drawings, and will be described in more detail hereinafter. These drawings and descriptions are not intended to limit the scope of the concept of the present application in any way, but to illustrate the concept of the present application to those skilled in the art by referring to specific embodiments.

DESCRIPTION OF EMBODIMENTS

As mentioned in the background art, at present, there are many types of material tests according to different material properties, for example, frictional wear test, collision test, hardness test and tensile test, etc. When carrying out these material property tests, due to different test methods, the current common test equipment usually can only carry out a single type of property test, so that different devices and equipment are needed to complete different material tests. This makes the function of the test equipment relatively single, and the test equipment needs to be repeatedly replaced to complete different material tests, which will also lead to a low testing efficiency of the material test.

The frictional wear and collision law of materials is an important direction for studying materials. For example, at a sealing surface of a valve, there will be a micron-level amplitude movement between polymer-metal mating contact surfaces and other mating contact surfaces, causing frictional wear. After the polymer-metal surfaces are pressed tightly to each other to produce an indentation, a composite form of friction between the polymer-metal surfaces, which is generated due to the small-amplitude vibration caused by the indentation, is called fretting friction. The fretting friction can not only cause frictional wear between the sealing contact surfaces of the valve, resulting in loose closing, poor sealing or formation of wear particles, etc., but also accelerate the deformation and repeated wear of the indentation. In addition, with the repeated opening and closing of and slight collision of the polymer-metal friction sealing surfaces and slight collision of the surface, the fatigue life of the valve for sealing is greatly reduced. With the requirements of high precision, long life and high reliability in high-tech fields such as liquid hydrogen and liquid oxygen valves for launch vehicles, as well as various harsh working conditions, the hazards of fretting damage and collision wear are increasingly prominent, and have become one of the main reasons for valve failure.

Liquid hydrogen and liquid oxygen valves for launch vehicles are often applied in extreme working conditions such as liquid hydrogen (−253° C.) and liquid oxygen (−183° C.) fluid medium, strong load (transient load up to 100 g) and multiple opening and closing (strong vibration, frequent actions more than 100 times). Besides, due to constant switching between a deep and low temperature and a normal temperature and there is no available lubricant between key mating surfaces, materials of the valve parts experience a constitutive switching process of low-temperature embrittlement, normal-temperature elasticity and high-temperature softening in a wide temperature range, and the contact behavior of the sealing and mating surfaces is significantly different from that in conventional working conditions, which makes the performance of conventionally designed and manufactured valves extremely easy to be out of tolerance when they are in service in extreme working conditions, and even which leads to functional failure, resulting in major accidents such as launch vehicle destruction and fatalities, causing serious negative social impacts. Therefore, the fretting-collision friction test of materials in wide temperature range is beneficial to deeply reveal the evolution law of frictional wear, failure mechanism and correlation law of valve materials in extreme environments.

Hence, in order to solve the above-mentioned technical problems, the embodiments of the present application provide a material testing machine, which is provided with a first fixing element, a second fixing element and a detection assembly. During test, the first testing element is fixed by the first fixing element, and the second testing element is fixed by the second fixing element; when the first fixing element and the second fixing element are in a first state, the first testing element is in sliding contact with the second testing element, and the detection assembly detects a friction force and/or a friction sound between the first testing element and the second testing element, so as to conduct a material friction test; when the first fixing element and the second fixing element are in a second state, a collision force received by the first testing element or the second testing element is detected by the detection assembly, so as to conduct a material collision test, which enables the material testing machine to be applied to both the material frictional wear test and the material collision test, solving the problems that the function of the testing equipment is relatively single and the testing efficiency is low.

Exemplary embodiments will be described in detail herein, examples of which are illustrated in the accompanying drawings. Unless otherwise indicated, the same numerals in different drawings refer to the same or similar elements when the following description refers to the drawings. The implementations described in the exemplary embodiments below are not intended to represent all implementations consistent with the present application. Rather, they are merely examples of devices and methods consistent with some aspects of the present application as recited in the appended claims.

The technical solutions of the present application and how the technical solutions of the present application solve the above-mentioned technical problems will be described in detail below in combination with specific embodiments. The following specific embodiments may be combined with each other, and the same or similar concepts or processes may not be repeated in some embodiments. The embodiments of the present application will be described below with reference to the accompanying drawings.

Figure 1:
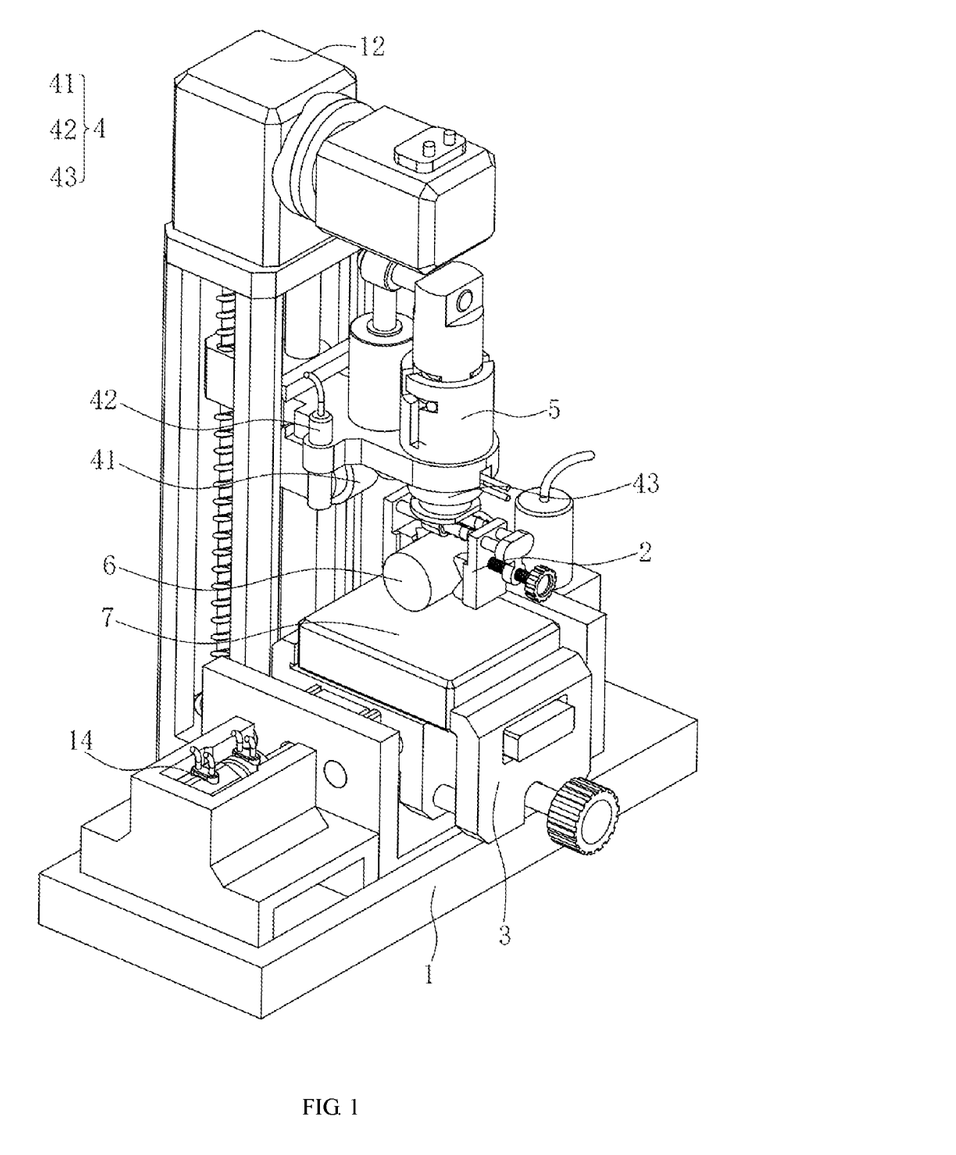
FIG. 1 is a schematic structural diagram of a material testing machine provided in an embodiment of the present application.

Referring to FIG. 1, a material testing machine provided by the present application includes a machine body 1, a first fixing element 2, a second fixing element 3 and a detection assembly 4; where both the first fixing element 2 and the second fixing element 3 are mounted to the machine body 1, the first fixing element 2 is configured to mount a first testing element 6, and the second fixing element 3 is configured to mount a second testing element 7; when the first fixing element 2 and the second fixing element 3 are in a first state, the first testing element 6 is in sliding contact with the second testing element 7, so as to conduct a frictional wear test; when the first fixing element 2 and the second fixing element 3 are in a second state, the first fixing element 2 drives the first testing element 6 to collide with the second testing element 7, so as to conduct a collision test.

Further referring to FIG. 1, the detection assembly 4 is configured to detect a target parameter, where when the first fixing element 2 and the second fixing element 3 are in the first state, the target parameter includes a friction force and/or a friction sound between the first testing element 6 and the second testing element 7; and when the first fixing element 2 and the second fixing element 3 are in the second state, the target parameter includes a collision force received by the first testing element 6 or the second testing element 7.

By using the above-mentioned technical solution, the first fixing element 2 is utilized to fix a first testing element 6, and the second fixing element 3 is utilized to fix a second testing element 7; when a material frictional wear test needs to be carried out, the first fixing element 2 and the second fixing element 3 are adjusted to the first state, so that the first testing element 6 and the second testing element 7 are in sliding contact, and the detection assembly 4 detects the friction force and/or friction sound between the first testing element 6 and the second testing element 7, so as to realize the material frictional wear test; and when a material collision test needs to be carried out, the first fixing element 2 and the second fixing element 3 are adjusted to the second state, so that the first fixing element 2 drives the first testing element 6 to collide with the second testing element 7, and the detection assembly 4 detects the collision force received by the first testing element 6 or the second testing element 7, so as to conduct a material collision test. Therefore, the material testing machine provided in the embodiment of the present application is enabled to be applied to a research on the wear failure mechanism of special materials of liquid hydrogen and liquid oxygen valves for launch vehicles under high frequency fretting-collision conditions in a wide temperature range.

It should be noted that, in an embodiment of the present application, exemplarily, exemplarily, both the first testing element 6 and the second testing element 7 are elements to be tested, or one of the first testing element 6 and the second testing element 7 is an element to be tested, and the other is an item used in the test. This may be adjusted according to specific circumstances and is not limited in the present application.

Figure 2:
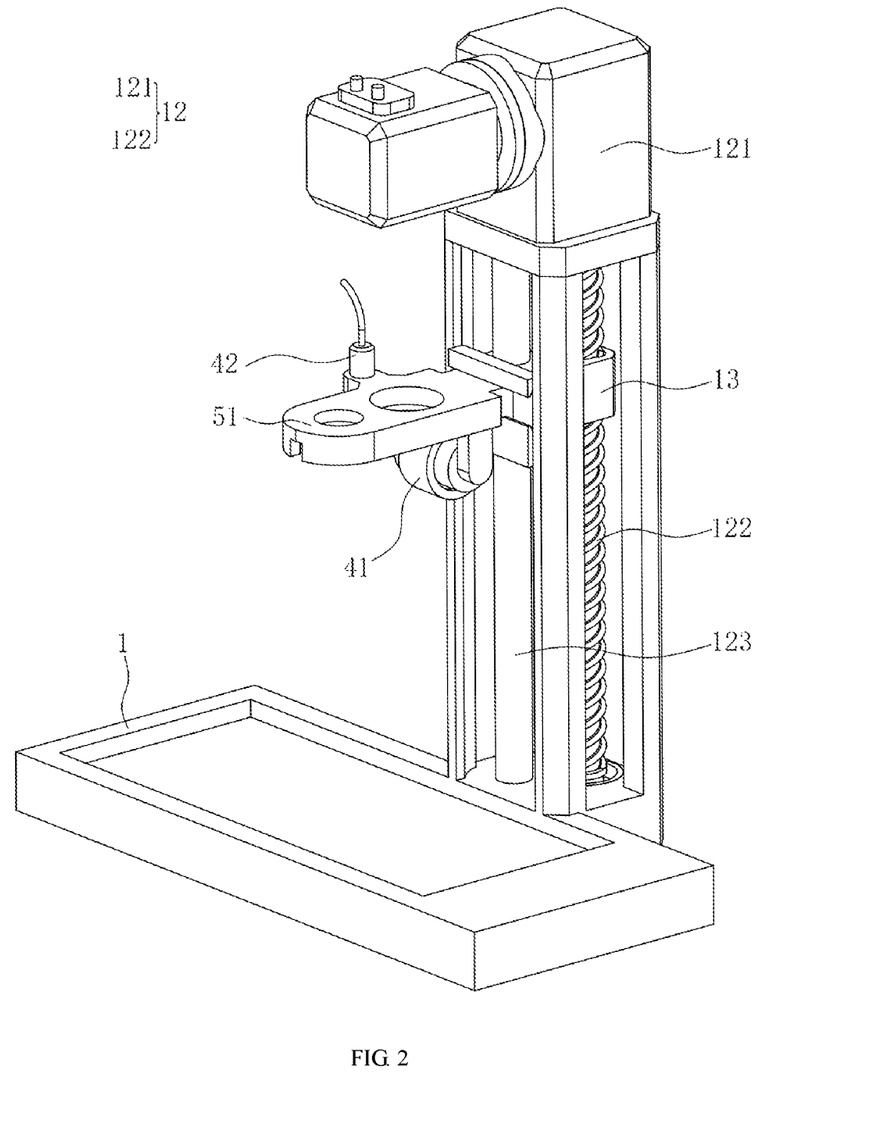
FIG. 2 is a schematic structural diagram of a moving device provided in an embodiment of the present application.

In an embodiment of the present application, exemplarily, referring to FIGS. 1 and 2, the machine body 1 is provided with a connecting seat 13, the connecting seat 13 is slidably arranged on the machine body 1 along a first direction, and the first fixing element 2 is slidably arranged on the connecting seat 13 along a second direction, the connecting seat 13 is provided with a collision device 5; the second fixing element 3 is slidably arranged on the machine body 1 along the second direction, and the machine body 1 is provided with a vibration element 14.

It is easy to be understood that, the first direction and the second direction can be set to be various directions, as long as it can be ensured that the first fixing element 2 and the second fixing element 3 can have the first state and the second state. Exemplarily, the first direction is set to be a vertical direction, and the second direction is set to be a horizontal direction.

Specifically, referring to FIGS. 1 and 2, exemplarily, when the first fixing element 2 and the second fixing element 3 are in the first state, that is, when the first testing element 6 is in sliding contact with the second testing element 7, the connecting seat 13 is located at a first position and fixed relative to the machine body 1, so that the first testing element 6 is fixed with the machine body 1 in the first direction; while in the second direction, the vibration element 14 drives the second fixing element 3 to vibrate, so as to drive the first fixing element 2 to slide on the connecting seat 13 along the second direction, and at the this time, the first testing element 6 slides on the second testing element 7, so as to conduct a material frictional wear test. Exemplarily, the vibration element 14 can be made of a piezoelectric ceramic, so that the second testing element 7 can vibrate by energizing the piezoelectric ceramic, and the piezoelectric ceramics can be used to realize high-frequency reciprocating and precise driving, where the piezoelectric ceramic has a vibration frequency of about 30 kHz, and a displacement of 20 μm.

When the first fixing element 2 and the second fixing element 3 are in the second state, that is, when the first testing element 6 collides with the second testing element 7, the second fixing element 3 is fixed relative to the machine body 1; the connecting seat 13 is located at the second position and fixed relative to the machine body 1, and in the first direction, there is a gap between the first testing element 6 and the second testing element 7, and the collision device 5 drives the first fixing element 2 to move along the first direction, so that the first testing element 6 collides with the second testing element 7, so as to conduct a material collision test.

It should be noted that the first position and the second position need to be adjusted according to the actual situation, where the first position needs to be determined when the first testing element 6 abuts against the second testing element 7, and the second position needs to be determined according to a size of the gap between the first testing element 6 and the second testing element 7.

In an embodiment of the present application, exemplarily, referring to FIG. 1, the detection assembly 4 includes a friction force sensor 41, a sound sensor 42 and a pressure sensor 43; where the friction force sensor 41 is mounted to the connecting seat 13 and is in sliding contact with the first fixing element 2, so as to detect the friction force between the first testing element 6 and the second testing element 7; the sound sensor 42 is mounted to the machine body 1; the pressure sensor 43 is mounted to the connecting seat 13, and is configured to detect a pressure on the first fixing element 2 in the first direction.

By adopting the above-mentioned technical solution, when using the material testing machine to carry out the frictional wear test, the position of the connecting seat 13 is adjusted so that the connecting seat 13 drives the first testing element 6 to slide in the first direction, and so that the first testing element 6 abuts against the second testing element 7, and the pressure sensor 43 can detect the pressure between first testing element 6 and the second testing element 7, so as to adjust the pressure of the first testing element 6 to the second testing element 7; the connecting seat 13 is located at the first position and is fixed relative to the machine body 1, so that the first testing element 6 is fixed with the machine body 1 in the first direction, but can slide on the connecting seat 13 along the second direction; and at this time, the vibration element 14 drives the second fixing element 3 to vibrate, so as to drive the first fixing element 2 to slide on the connecting seat 13 in the second direction, and at this time the first testing element 6 slides on the second testing element 7, and the friction force sensor 41 detects the friction force between the first testing element 6 and the second testing element 7, and the sound sensor 42 detects a noise generated by the friction between the first testing element 6 and the second testing element 7, and records a peak value of the sound wave, so that the material frictional wear test can be completed.

When using the material testing machine to conduct a collision test, the position of the connecting seat 13 is adjusted so that the connecting seat 13 drives the first testing element 6, which is spaced apart from the second testing element 7, to slide along the first direction, then the collision device 5 drives the first fixing element 2 to move in the first direction, so that the first testing element 6 collides with the second testing element 7; and the pressure sensor 43 detects the collision force generated when the first testing element 6 collides with the second testing element 7, so as to conduct the material collision test.

Figure 3:
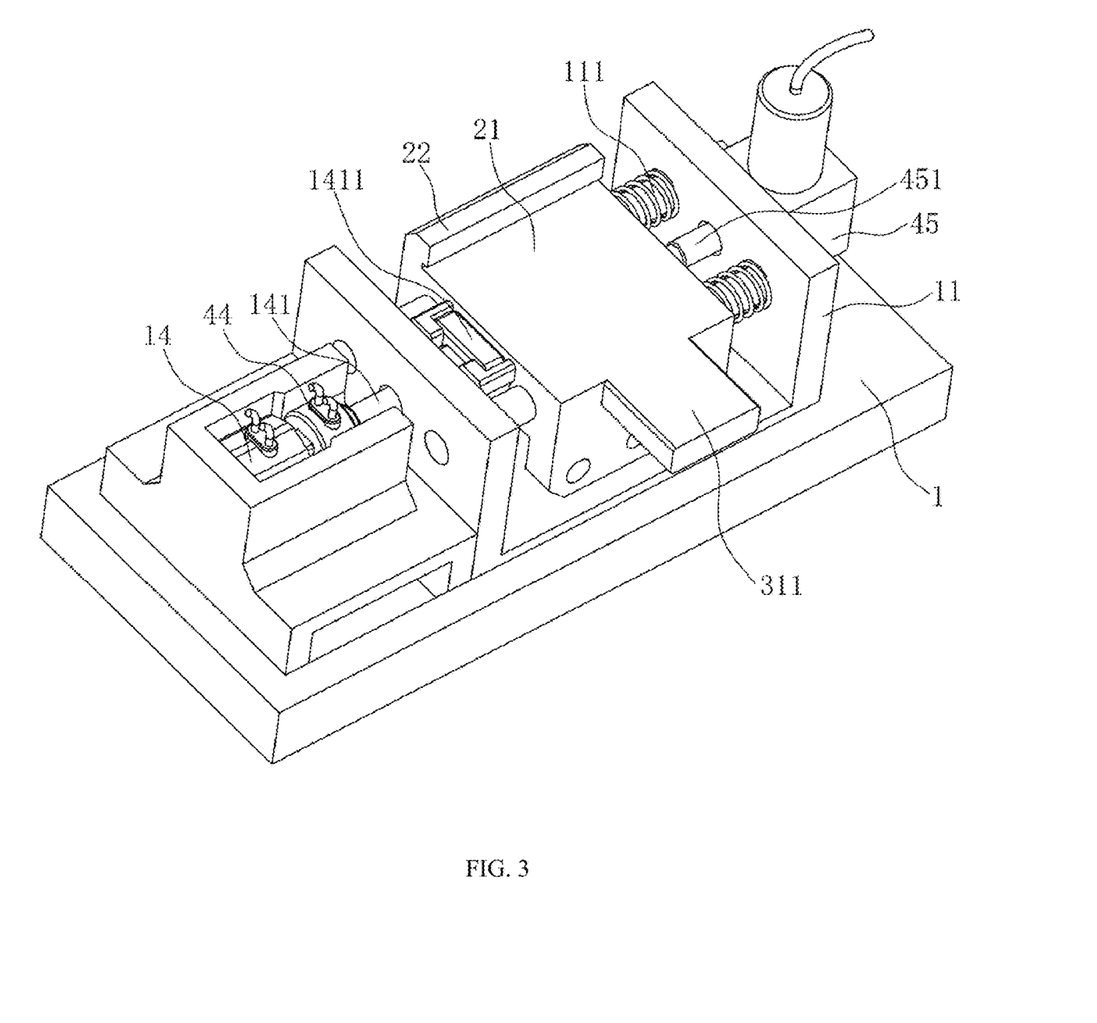
FIG. 3 is a schematic diagram of a mounting structure of a vibration element provided in an embodiment of the present application.

In an embodiment of the present application, exemplarily, referring to FIG. 1 and FIG. 3, the detection assembly 4 further includes a vibration sensor 44 and/or a travel sensor 45. When the first fixing element 2 and the second fixing element 3 are in the first state, the vibration sensor 44 is configured to detect a vibration frequency and a vibration amplitude of the second fixing element 3; and the travel sensor 45 is configured to detect a vibration displacement of the second fixing element 3 in the second direction. The vibration sensor 44 and the travel sensor 45 can be mounted to the machine body 1 simultaneously, or one of the vibration sensor 44 and the travel sensor 45 can be provided on the machine body 1.

When the vibration element 14 drives the second fixing element 3 to vibrate in the second direction, the vibration sensor 44 can detect the vibration frequency and the vibration amplitude of the second fixing element 3; and the travel sensor 45 can detect the vibration displacement of the second fixing element 3 in the second direction. Therefore, the test process of the frictional wear test is more accurate, and more reference data can be obtained.

Referring to FIGS. 1 and 2, in an embodiment of the present application, exemplarily, the machine body 1 further includes a moving device 12, and the moving device 12 includes a moving screw 122 and a power element 121; the moving screw 122 extends along the first direction, and is rotatably mounted to the machine body 1 around the first direction, and the connecting seat 13 is threaded to the moving screw 122; and the power element 121 is mounted to the machine body 1 and is configured to drive the moving screw 122 to rotate. Therefore, the moving screw 122 drives the connecting seat 13 to move along in the first direction. The machine body 1 is further provided with a sliding rod 123, which extends along the first direction and is disposed to pass through the connecting seat 13, so as to play a certain guiding role in the sliding process of the connecting seat 13.

By adopting the above technical solution, when the position of the connecting seat 13 in the first direction is adjusted, the power element 121 drives the moving screw 122 to rotate around the first direction, and the moving screw 122 is threaded to the connecting seat 13, so that the connecting seat 13 can move on the moving screw 122 in the first direction, so as to adjust the position of the connecting seat 13, thereby realizing the adjustment of the pressure of the first testing element 6 to the second testing element 7 in the frictional wear test, and the adjustment of the size of the gap between the first testing element 6 and the second test element 7 in the collision test.

As for the power element 121, it can be selected from a variety of devices or equipment, such as an electric motor or a decelerated motor, as long as the normal rotation of the moving screw 122 can be ensured. It is worth mentioning that when a decelerated motor is selected as the power element 121, the power element 121 can drive the moving screw 122 to rotate at a slow speed, so that a moving speed of the connecting seat 13 on the moving screw 122 is reduced, so as to further ensure the stability of the connecting seat 13 when it slides along the second direction on the moving screw 122.

Figure 4:
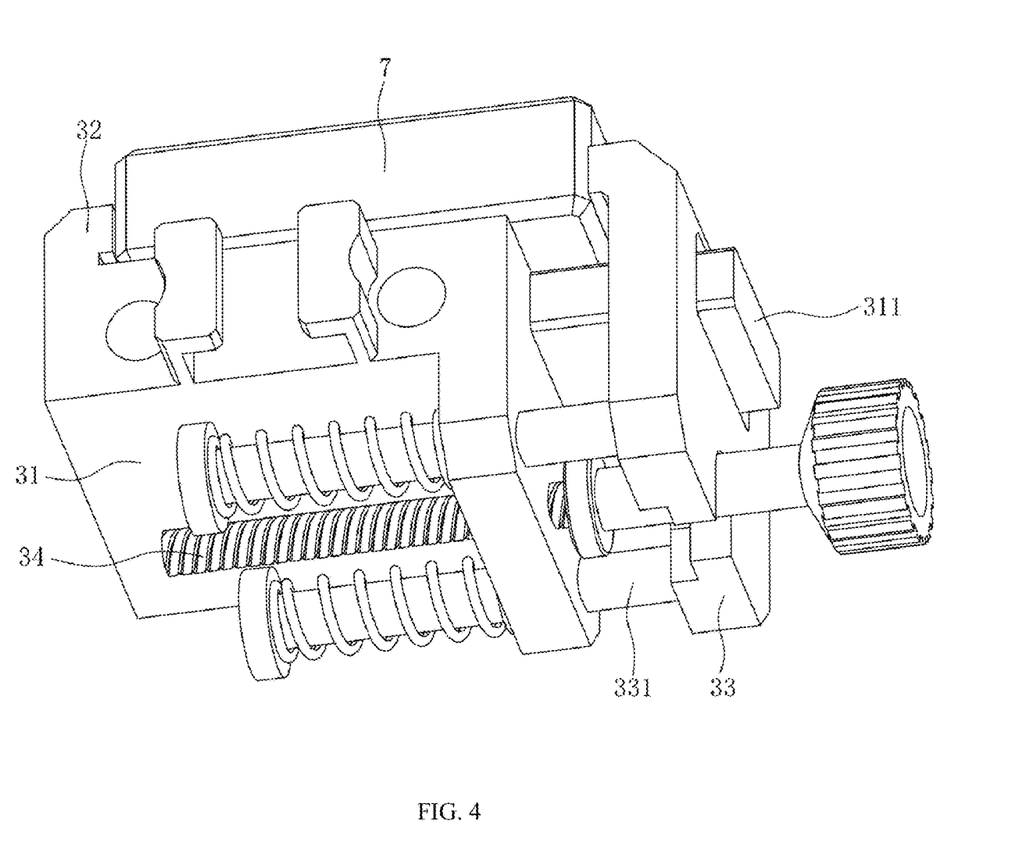
FIG. 4 is a schematic structural diagram of a second fixing element provided in an embodiment of the present application.

The structure of the second fixing element 3 and the mounting mode of the second fixing element 3 are described below. Referring to FIGS. 3 and 4, in an embodiment of the present application, exemplarily, the second fixing element 3 includes a second fixing portion 31, a first chuck 32, a second chuck 33 and a fixing screw 34; where the first chuck 32 is fixedly mounted to the second fixing portion 31, the second chuck 33 is arranged opposite to the first chuck 32 and is slidably mounted to the second fixing portion 31 along a direction close to or away from the first chuck 32, so that the second testing element 7 can be fixed by the first chuck 32 and the second chuck 33, and the fixing screw 34 is threaded to the second fixing portion 31 and abuts against the second chuck 33 tightly.

Continuing to refer to FIGS. 3 and 4, exemplarily, the first chuck 32 and the second chuck 33 are arranged along a third direction, and the second chuck 33 is further provided with a plurality of guiding rods 331, each guiding rod 331 extends in the third direction, first ends of the guiding rods 331 are connected to the second chuck 33, second ends of the guiding rods 331 pass through the second fixing portion 31, and each of the guiding rods 331 is sleeved with a spring in an elongated state. One end of the spring is connected to the second end of the guiding rod 331, and the other end of the spring is connected to the second fixing portion 31. The second fixing portion 31 is also provided with a guiding portion 311. The guiding portion 311 extends along the third direction and passes through the second chuck 33, so as to play a certain guiding role in the movement of the second chuck 33.

By adopting the above technical solution, when the second testing element 7 is to be fixed by the second fixing element 3, the second testing element 7 is placed on the second fixing portion 31, and is located between the first chuck 32 and the second chuck 33, and by compressing the spring, the second chuck 33 is driven to move toward a direction close to the first chuck 32, so that the second chuck 33 and the first chuck 32 clamp the second testing element 7 tightly, and the guiding portion 311 is disposed to pass through the second chuck 33 so as to play a certain guiding role, and then the fixing screw 34 is tightened, so that the fixing screw 34 is threaded to the second fixing portion 31, and abuts against the second chuck 33 tightly. In this way, the second testing element 7 is fixed by the second fixing element 3.

The mounting mode between the second fixing element 3 and the machine body 1 will be described below in conjunction with the accompanying drawings. Referring to FIGS. 3 and 4, exemplarily, in a horizontal plane, the third direction is perpendicular to the second direction. The machine body 1 is provided with a mounting frame 11, and the mounting frame 11 is provided with two limiting rods 111, the two limiting rods 111 extend in the second direction, and are both disposed to pass through the second fixing portion 31; the vibration element 14 has a vibration shaft 141, and the vibration shaft 141 of the vibration element 14 extends along the second direction and passes through the mounting frame 11, and the vibration shaft 141 of the vibration element 14 is connected with a connecting block 1411, so as to be connected to the second fixing portion 31 through the connecting block 1411 and thus drive the second fixing portion 31 to vibrate in the second direction. The vibration sensor 44 is mounted between the vibration element 14 and the vibration shaft 141, so that the detection of the vibration sensor 44 is more accurate; and the travel sensor 45 is mounted to a side of the mounting frame 11 away from the vibration element 14 in the second direction, and the travel sensor 45 is provided with a detection rod 451, the detection rod 451 extends in the second direction, and passes through the mounting frame 11 to abut against the second fixing portion 31.

Referring to FIGS. 2 and 5-7, in an embodiment of the present application, exemplarily, a mounting substrate 51 is slidably arranged on the connecting seat 13, the mounting substrate 51 can slide on the connecting seat 13 along the second direction, and the collision device 5 is mounted to the mounting substrate 51, so that the collision device 5 can be mounted to the connecting seat 13 through the mounting substrate 51. Specifically, the collision device 5 includes a mounting seat 52 and a sliding column 53, the mounting seat 52 is mounted to the mounting substrate 51, and the sliding column 53 is connected to the first fixing element 2; when the sliding column 53 is in the first state, the sliding column 53 is fixed with the mounting seat 52; when the sliding column 53 is in the second state, the sliding column 53 slides on the mounting seat 52 in the first direction, so that the first testing element 6 is driven by the first fixing element 2 to collide with the second testing element 7.

By adopting the above technical solution, when using the material testing machine for the collision test, the position of the connecting seat 13 is adjusted so that the connecting seat 13 moves in the first direction, and there is a gap between the first testing element 6 and the second testing element 7; the sliding column 53 is adjusted so that the sliding column 53 is in the first state, and the sliding column 53 is fixed with the mounting seat 52; then the sliding column 53 is adjusted to the second state, so that the sliding column 53 slides on the mounting seat 52 along the first direction, and drives the first testing element 6 to move towards the direction close to the second testing element 7, and the first testing element 6 collides with the second testing element 7, thereby realizing the material collision test process.

Referring to FIGS. 1 and 5-7, the first fixing element 2 is mounted to one end of the sliding column 53 along the first direction, and is close to the second fixing element 3; the pressure sensor 43 is arranged between the first fixing element 2 and the sliding column 53, that is, the pressure sensor 43 is connected to the sliding column 53, and the first fixing element 2 is connected to the pressure sensor 43, so that the detection result of the pressure sensor 43 is more accurate. The friction force sensor 41 is mounted to the connecting seat 13 and abuts against the mounting substrate 51, so as to realize the detection of the friction force between the first testing element 6 and the second testing element 7.

Figure 5:
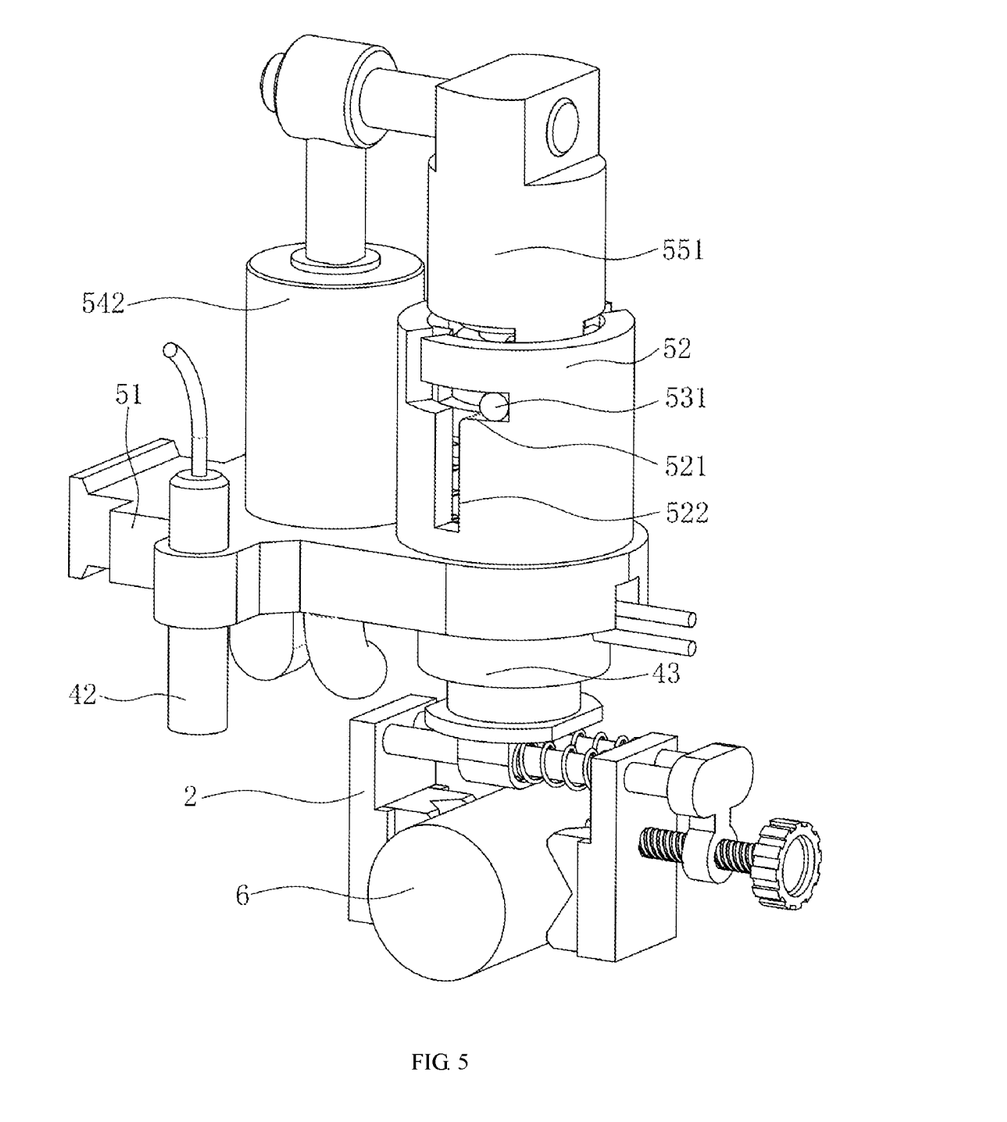
FIG. 5 is a schematic structural diagram of a collision device provided in an embodiment of the present application.
Figure 6:
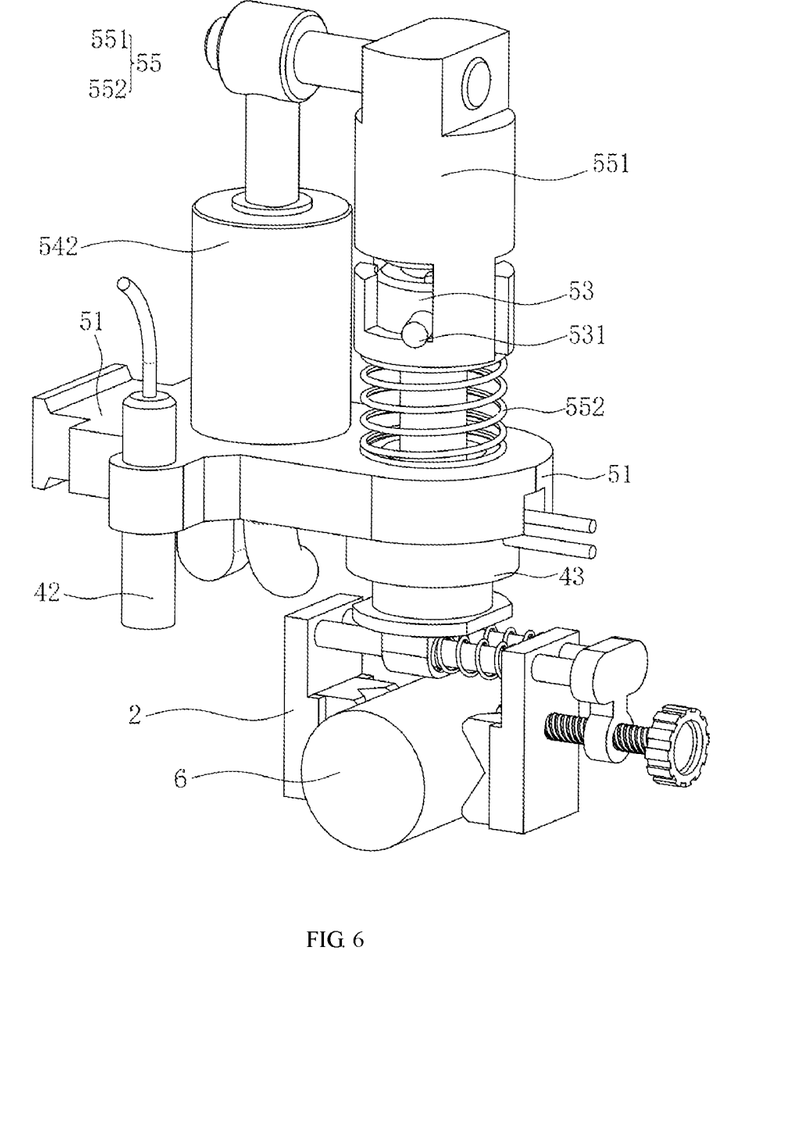
FIG. 6 is a schematic structural diagram illustrating a sliding column provided in an embodiment of the present application.
Figure 7:
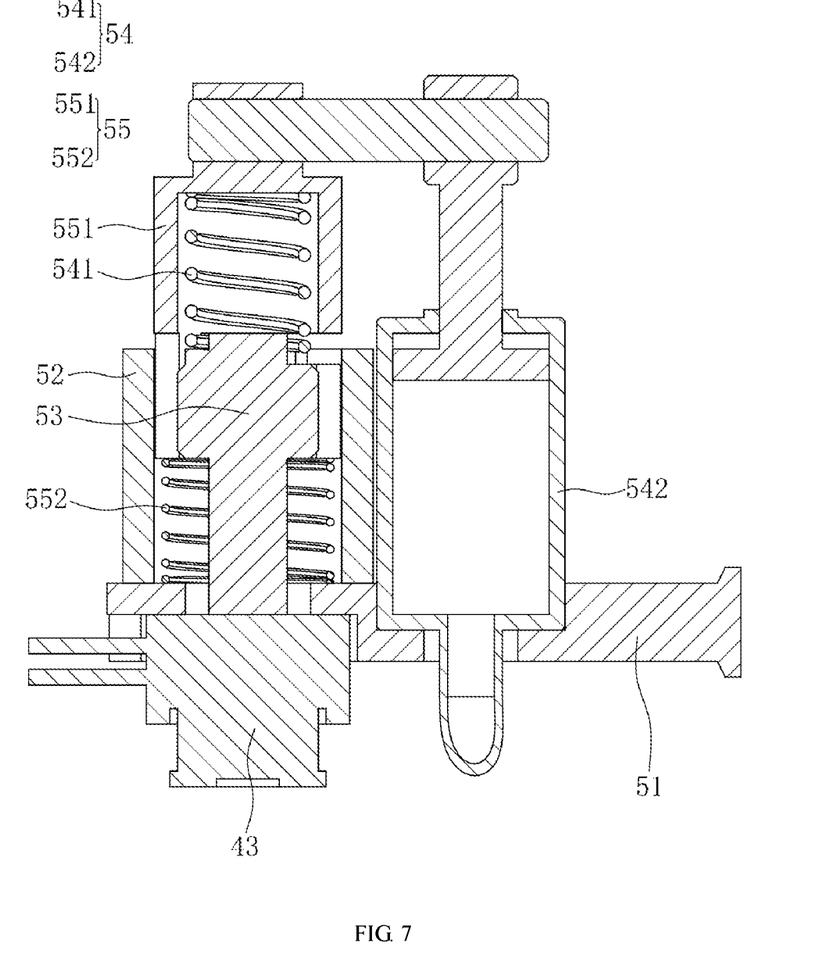
FIG. 7 is a cross-sectional view of a collision device provided in an embodiment of the present application.

Continuing to refer to FIGS. 5-7, exemplarily, the mounting seat 52 is provided with a sliding groove 522 and a fixing groove 521, which are communicated with each other; the sliding groove 522 extends along the first direction, and an included angle is formed between an extension direction of the fixing groove 521 and the first direction; the sliding column 53 is provided with a control head 531, and when the sliding column 53 is in the first state, the control head 531 is clamped in the fixing groove 521, so that the sliding column 53 can be fixed with the mounting seat 52; and when the column 53 is in the second state, the control head 531 slides in the sliding groove 522 in the first direction, so that the first fixing element 2 drives the first testing element 6 to collide with the second testing element 7.

Referring to FIGS. 5-7, the collision device 5 further includes an adjustment assembly 54. The adjustment assembly 54 includes a first elastic element 541 and a drive element 542. The drive element 542 is mounted to the mounting substrate 51 and has a piston rod. A first end of the first elastic element 541 is connected to the sliding column 53, a second end of the first elastic element 541 is connected to the piston rod of the drive element 542, and a telescopic direction of the first elastic element 541 is the first direction; and when the sliding column 53 is in the first state, the drive element 542 drives the first elastic element 541 to be compressed.

By adopting the above technical solution, when using the material testing machine for the collision test, the control head 531 is adjusted first to be placed in the fixing groove 521, so that the sliding column 53 is in the first state; then the piston rod of the drive element 542 is shortened, thereby driving the first elastic element 541 to be compressed; then the position of the control head 531 is adjusted, so that the control head 531 moves into the sliding groove 522, and the first elastic element 541 extends, thereby driving the sliding column 53 to move in the first direction, and the control head 531 slides in the sliding groove 522 along the first direction, so as to drive the first testing element 6 to move along the first direction.

It should be noted that, the collision device 5 can adjust a compression amount of the first elastic element 541 by adjusting the length of the piston rod, so that the moving speed of the sliding column 53 in the first direction can be adjusted through the adjusting assembly 54 and thus the moving speed of the first testing element 6 can be adjusted, to obtain the collision results at different speeds, so as to make the results of the material collision test more accurate; and in the embodiment of the present application, the collision force of the collision device 5 can be adjusted by changing the size of the diameter of the first elastic element in the test, so that the advantage of controllable and adjustable collision force during the test can be realized, which makes up for the blank of the existing technology.

Referring to FIGS. 5-7, in an embodiment of the present application, exemplarily, the collision device 5 further includes a rebound assembly 55, and the rebound assembly 55 includes a rebound element 551 and a second elastic element 552; the rebound element 551 is connected to the piston rod of the drive element 542 and slidably arranged on the mounting seat 52 along the first direction; the rebound element 551 is cylindrical, and an opening of the rebound element 551 faces the mounting substrate 51; the sliding column 53 and the first elastic element 541 are both arranged on an inner side of the rebound element 551, the first elastic element 541 is connected to the rebound element 551; a first end of the second elastic element 552 is connected to the mounting substrate 51, and a second end of the second elastic element 552 is connected to the on the rebound element 551, and a telescopic direction of the second elastic element 552 is the first direction.

By adopting the above technical solution, when the piston rod of the drive element 542 is shortened to drive the first elastic element 541 to be compressed, the rebound element 551 compresses the second elastic element 552, so that the second elastic element 552 is compressed; when the control head 531 slides from the fixing groove 521 into the sliding groove 522, the sliding column 53 moves in the first direction, and at this time, the sliding column 53 passes through the second elastic elements 552 and the second elastic element 552 is stretched, thereby driving the rebound element 551 to reset.

The first fixing element 2 and the mounting mode between the first fixing element 2 and the pressure sensor 43 will be described below with reference to FIGS. 7 and 8. Exemplarily, the first fixing element 2 includes a first fixing portion 21, a first clamping plate 22, a second clamping plate 23 and a driving screw 24; the first clamping plate 22 is fixedly mounted to the first fixing portion 21, the second clamping plate 23 is arranged opposite to the first clamping plate 22, and is slidably mounted to the first fixing portion 21 along the direction close to or away from the first clamping plate 22; the driving screw 24 is threaded to the first fixing portion 21, and the driving screw 24 is rotatably connected to the second clamping plate 23, so that the distance between the second clamping plate 23 and the first clamping plate 22 can be adjusted by using the driving screw 24.

By adopting the above technical solution, when using the first fixing element 2 to clamp the first testing element 6, the first testing element 6 is placed between the first clamping plate 22 and the second clamping plate 23, and then the driving screw 24 is rotated, so that the driving screw 24 drives the second clamping plate 23 to move toward the direction close to the first clamping plate 22, thereby clamping the first testing element 6.

Figure 8:
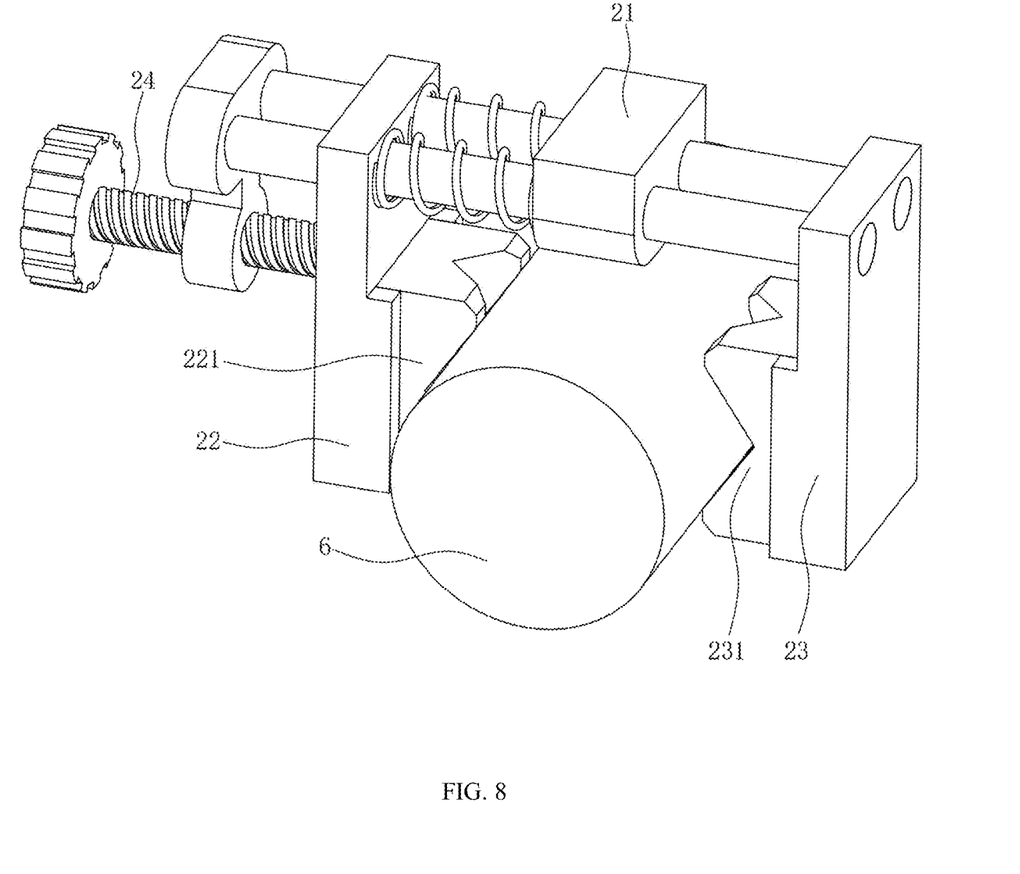
FIG. 8 is a schematic structural diagram of a first fixing element provided in an embodiment of the present application.

Referring to FIG. 8, considering that the first testing element 6 can be set in various shapes, in an embodiment of the present application, exemplarily, a first clamping block 221 is provided on the first clamping plate 22, and correspondingly, a second clamping block 231 is provided on the second clamping plate 23; the first clamping block 221 and the second clamping block 231 are used cooperatively and are arranged on a side where the first clamping plate 22 and the second clamping plate 23 are close to each other, so that the first clamping block 221 and the second clamping block 231 clamp the first testing element 6 tightly, which makes the fixing effect of the first fixing element 2 on the first testing element 6 better. By using the first clamping block 221 and the second clamping block 231 to cooperate, the fixing element 2 can clamp and fix the first testing element 6 through one or more of a point contact, a line contact and a surface contact As for the way in which the first clamping block 221 is mounted to the first clamping plate 22 and the way in which the second clamping block 231 is mounted to the second clamping plate 23, they can be implemented in various ways, such as welding or bolting, and is not further limited in the present application.

By adopting the above technical solution, when the first testing element 6 is clamped by the first fixing element 2, the first clamping block 221 and the second clamping block 231 are used cooperatively, so that the first testing element 6 can be fixed, and the first testing elements 6 in various shapes, such as cylindrical or spherical, can be clamped, which makes the use of the first fixing element 2 more convenient.

It should be noted that, in an embodiment of the present application, both the first fixing element 2 and the second fixing element 3 adopt a flexible clamping structure, so that the clamping force of the first fixing element 2 to the first testing element 6 and the clamping force of the second fixing element 3 to the second testing element 7 can be controlled and adjusted, so as to solve an inaccuracy problem of the test parameters of the frictional wear test and the collision test caused by an unstable clamping force.

Continuing to refer to FIG. 8, in an embodiment of the present application, exemplarily, the first clamping plate 22 and the second clamping plate 23 are arranged in the third direction; a side of the pressure sensor 43 away from the sliding column 53 is connected to the first fixing portion 21, so that the first fixing element 2 can be mounted to the sliding column 53 through the pressure sensor 43, which also makes the detection effect of the pressure sensor 43 more accurate.

It is easy to understand that the pressure sensor 43 can be rotatably connected to the sliding column 53, so that the pressure sensor 43 does not rotate together with the sliding column 53 when the sliding column 53 rotates; or the pressure sensor 43 can also be fixedly mounted to the sliding column 53, so that the pressure sensor 43 is driven to rotate when the sliding column 53 rotates. At this time, a wire for supplying power to the pressure sensor 43 or for communication needs to be made of a soft material, so as to avoid the influence of the wire on the rotation process of the pressure sensor 43.

To sum up, when using the material testing machine to conduct the frictional wear test, the position of the connecting seat 13 is adjusted so that the connecting seat 13 drives the first testing element 6 to slide in the first direction, the first testing element 6 abuts against the second testing element 7, and the pressure sensor 43 can detect the pressure between the first testing element 6 and the second testing element 7, and thus the pressing force of the first testing element 6 to the second testing element 7 can be adjusted; the connecting seat 13 is arranged in the first position and is fixed relative to the machine body 1, and the first testing element 6 is fixed to the machine body 1 in the first direction, but can slide on the connecting seat 13 along the second direction; at this time, the vibration element 14 drives the second fixing element 3 to vibrate, so as to drive the first fixing element 2 to slide on the connecting seat 13 along the second direction, and at this time, the first testing element 6 slides on the second testing element 7, the friction force sensor 41 detects the friction force between the first testing element 6 and the second testing element 7, and the sound sensor 42 detects the noise generated due to the friction between the first testing element 6 and the second testing element 7, and records the peak value of the sound wave, so as to complete the material frictional wear test.

When using the material testing machine to conduct a collision test, the position of the connecting seat 13 is adjusted so that the connecting seat 13 drives the first testing element 6 to slide along the first direction, where there is a gap between the first testing element 6 and the second testing element 7, and then the collision device 5 drives the first fixing element 2 to move in the first direction, so that the first testing element 6 collides with the second testing element 7; the pressure sensor 43 detects the collision force generated when the first testing element 6 collides with the second testing element 7, so as to conduct the material collision test. Therefore, the material testing machine can be applied to both the material frictional wear test and the material collision test, which solves the problem that the function of the testing equipment is relatively single.

Other embodiments of the present application will readily conceived by those skilled in the art upon consideration of the specification and practice of the present application disclosed herein. The present application is intended to cover any variations, uses or adaptive changes of the present application that follow the general principle of the present application and include common knowledge or conventional techniques in the technical field not disclosed in the present application. The description and embodiments are to be regarded as exemplary only, and the true scope and spirit of the present application are indicated by the following claims.

It should be understood that the present application is not limited to the precise structures described above and shown in the accompanying drawings and that various modifications and changes may be made without departing from the scope thereof. The scope of the application is limited only by the appended claims.

What is claimed is:

1. A material testing machine, comprising a machine body, a first fixing element, a second fixing element and a detection assembly;

both the first fixing element and the second fixing element are mounted to the machine body, the first fixing element is configured to mount a first testing element, and the second fixing element is configured to mount a second testing element; when the first fixing element and the second fixing element are in a first state, the first testing element is in sliding contact with the second testing element; and when the first fixing element and the second fixing element are in a second state, the first fixing element drives the first testing element to collide with the second testing element;

the detection assembly is configured to detect a target parameter, and when the first fixing element and the second fixing element are in the first state, the target parameter comprises at least one of a friction force between the first testing element and the second testing element and a friction sound generated due to the sliding contact between the first testing element and the second testing element; and when the first fixing element and the second fixing element are in the second state, the target parameter comprises a collision force received by the first testing element or the second testing element.

2. The material testing machine according to claim 1, wherein the machine body is provided with a connecting seat, the connecting seat is slidably arranged on the machine body along a first direction, the first fixing element is slidably arranged on the connecting seat along a second direction, the second direction is perpendicular to the first direction, and the connecting seat is provided with a collision device; and the second fixing element is slidably arranged on the machine body along the second direction, and the machine body is provided with a vibration element;

when the first fixing element and the second fixing element are in the first state, the connecting seat is located at a first position and fixed relative to the machine body, and in the second direction, the vibration element drives the second fixing element to vibrate, so as to drive the first fixing element to slide on the connecting seat along the second direction;

when the first fixing element and the second fixing element are in the second state, the second fixing element is fixed relative to the machine body; the connecting seat is located at a second position and fixed relative to the machine body, and in the first direction, there is a gap between the first testing element and the second testing element, and the collision device drives the first fixing element to move along the first direction so that the first testing element collides with the second testing element.

3. The material testing machine according to claim 2, wherein the detection assembly comprises a friction force sensor, a sound sensor and a pressure sensor;

the friction force sensor is mounted to the connecting seat and is in sliding contact with the first fixing element, so as to detect a friction force generated due to the sliding contact between the first testing element and the second testing element;

the sound sensor is mounted to the machine body, and is configured to detect a friction sound generated due to the sliding contact between the first testing element and the second testing element;

the pressure sensor is mounted to the connecting seat and is configured to detect a pressure on the first fixing element in the first direction.

4. The material testing machine according to claim 3, wherein the detection assembly further comprises at least one of a vibration sensor and a travel sensor;

when the first fixing element and the second fixing element are in the first state, the vibration sensor is configured to detect a vibration frequency and a vibration amplitude of the second fixing element; the travel sensor is configured to detect a vibration displacement of the second fixing element in the second direction.

5. The material testing machine according to claim 4, wherein the first fixing element comprises a first fixing portion, a first clamping plate, a second clamping plate and a driving screw;

the first clamping plate is fixedly mounted to the first fixing portion, the second clamping plate is arranged opposite to the first clamping plate, and is slidably mounted to the first fixing portion along a direction close to or away from the first clamping plate; the driving screw is threaded to the first fixing portion, and the driving screw is rotatably connected to the second clamping plate;

and/or, the second fixing element comprises a second fixing portion, a first chuck, a second chuck and a fixing screw;

the first chuck is fixedly mounted to the second fixing portion, the second chuck is arranged opposite to the first chuck, and is slidably mounted to the second fixing portion along a direction close to or away from the first chuck, the fixing screw is threaded to the second fixing portion, and abuts against the second chuck tightly.

6. The material testing machine according to claim 3, wherein the first fixing element comprises a first fixing portion, a first clamping plate, a second clamping plate and a driving screw;

the first clamping plate is fixedly mounted to the first fixing portion, the second clamping plate is arranged opposite to the first clamping plate, and is slidably mounted to the first fixing portion along a direction close to or away from the first clamping plate; the driving screw is threaded to the first fixing portion, and the driving screw is rotatably connected to the second clamping plate;

and/or, the second fixing element comprises a second fixing portion, a first chuck, a second chuck and a fixing screw;

the first chuck is fixedly mounted to the second fixing portion, the second chuck is arranged opposite to the first chuck, and is slidably mounted to the second fixing portion along a direction close to or away from the first chuck, the fixing screw is threaded to the second fixing portion, and abuts against the second chuck tightly.

7. The material testing machine according to claim 2, wherein the collision device comprises a mounting seat, a sliding column and a mounting substrate, the mounting substrate is mounted to the connecting seat, the mounting seat is connected to the mounting substrate, and the sliding column is connected to the first fixing element;

when the sliding column is in a first state, the sliding column is fixed with the mounting seat; when the sliding column is in a second state, the sliding column slides on the mounting seat along the first direction, so that the first fixing element drives the first testing element to collide with the second testing element.

8. The material testing machine according to claim 7, wherein the collision device further comprises an adjustment assembly, the adjustment assembly comprises a first elastic element and a drive element, the drive element is mounted to the mounting substrate and has a piston rod, a first end of the first elastic element is connected to the sliding column, a second end of the first elastic element is connected to the piston rod of the drive element, and a telescopic direction of the first elastic element is the first direction; and when the sliding column is in the first state, the drive element drives the first elastic element to be compressed.

9. The material testing machine according to claim 8, wherein the collision device further comprises a rebound assembly, and the rebound assembly comprises a rebound element and a second elastic element;

the rebound element is connected to the piston rod of the drive element, and is slidably arranged on the mounting seat along the first direction, and the first elastic element is connected to the rebound element; and a first end of the second elastic element is connected to the mounting substrate, a second end of the second elastic element is connected to the rebound element, and a telescopic direction of the second elastic element is the first direction.

10. The material testing machine according to claim 9, wherein the first fixing element comprises a first fixing portion, a first clamping plate, a second clamping plate and a driving screw;

the first clamping plate is fixedly mounted to the first fixing portion, the second clamping plate is arranged opposite to the first clamping plate, and is slidably mounted to the first fixing portion along a direction close to or away from the first clamping plate; the driving screw is threaded to the first fixing portion, and the driving screw is rotatably connected to the second clamping plate;

and/or, the second fixing element comprises a second fixing portion, a first chuck, a second chuck and a fixing screw;

the first chuck is fixedly mounted to the second fixing portion, the second chuck is arranged opposite to the first chuck, and is slidably mounted to the second fixing portion along a direction close to or away from the first chuck, the fixing screw is threaded to the second fixing portion, and abuts against the second chuck tightly.

11. The material testing machine according to claim 8, wherein the first fixing element comprises a first fixing portion, a first clamping plate, a second clamping plate and a driving screw;

the first clamping plate is fixedly mounted to the first fixing portion, the second clamping plate is arranged opposite to the first clamping plate, and is slidably mounted to the first fixing portion along a direction close to or away from the first clamping plate; the driving screw is threaded to the first fixing portion, and the driving screw is rotatably connected to the second clamping plate;

and/or, the second fixing element comprises a second fixing portion, a first chuck, a second chuck and a fixing screw;

the first chuck is fixedly mounted to the second fixing portion, the second chuck is arranged opposite to the first chuck, and is slidably mounted to the second fixing portion along a direction close to or away from the first chuck, the fixing screw is threaded to the second fixing portion, and abuts against the second chuck tightly.

12. The material testing machine according to claim 7, wherein the mounting seat is provided with a sliding groove and a fixing groove, which are communicated with each other; the sliding groove extends along the first direction, and an included angle is formed between an extending direction of the fixing groove and the first direction; and the sliding column is provided with a control head, and when the sliding column is in the first state, the control head is clamped in the fixing groove, and when the sliding column is in the second state, the sliding column slides in the sliding groove along the first direction.

13. The material testing machine according to claim 12, wherein the first fixing element comprises a first fixing portion, a first clamping plate, a second clamping plate and a driving screw;

the first clamping plate is fixedly mounted to the first fixing portion, the second clamping plate is arranged opposite to the first clamping plate, and is slidably mounted to the first fixing portion along a direction close to or away from the first clamping plate; the driving screw is threaded to the first fixing portion, and the driving screw is rotatably connected to the second clamping plate;

and/or, the second fixing element comprises a second fixing portion, a first chuck, a second chuck and a fixing screw;

the first chuck is fixedly mounted to the second fixing portion, the second chuck is arranged opposite to the first chuck, and is slidably mounted to the second fixing portion along a direction close to or away from the first chuck, the fixing screw is threaded to the second fixing portion, and abuts against the second chuck tightly.

14. The material testing machine according to claim 7, wherein the first fixing element comprises a first fixing portion, a first clamping plate, a second clamping plate and a driving screw;

the first clamping plate is fixedly mounted to the first fixing portion, the second clamping plate is arranged opposite to the first clamping plate, and is slidably mounted to the first fixing portion along a direction close to or away from the first clamping plate; the driving screw is threaded to the first fixing portion, and the driving screw is rotatably connected to the second clamping plate;

and/or, the second fixing element comprises a second fixing portion, a first chuck, a second chuck and a fixing screw;

the first chuck is fixedly mounted to the second fixing portion, the second chuck is arranged opposite to the first chuck, and is slidably mounted to the second fixing portion along a direction close to or away from the first chuck, the fixing screw is threaded to the second fixing portion, and abuts against the second chuck tightly.

15. The material testing machine according to claim 2, wherein the machine body is provided with a moving device, and the moving device comprises a moving screw and a power element; and the moving screw extends along the first direction, and is rotatably mounted to the machine body around the first direction, and the connecting seat is threaded to the moving screw; the power element is mounted to the machine body, and is configured to drive the moving screw to rotate.

16. The material testing machine according to claim 15, wherein the first fixing element comprises a first fixing portion, a first clamping plate, a second clamping plate and a driving screw;

the first clamping plate is fixedly mounted to the first fixing portion, the second clamping plate is arranged opposite to the first clamping plate, and is slidably mounted to the first fixing portion along a direction close to or away from the first clamping plate; the driving screw is threaded to the first fixing portion, and the driving screw is rotatably connected to the second clamping plate;

and/or, the second fixing element comprises a second fixing portion, a first chuck, a second chuck and a fixing screw;

the first chuck is fixedly mounted to the second fixing portion, the second chuck is arranged opposite to the first chuck, and is slidably mounted to the second fixing portion along a direction close to or away from the first chuck, the fixing screw is threaded to the second fixing portion, and abuts against the second chuck tightly.

17. The material testing machine according to claim 2, wherein the first fixing element comprises a first fixing portion, a first clamping plate, a second clamping plate and a driving screw;

the first clamping plate is fixedly mounted to the first fixing portion, the second clamping plate is arranged opposite to the first clamping plate, and is slidably mounted to the first fixing portion along a direction close to or away from the first clamping plate; the driving screw is threaded to the first fixing portion, and the driving screw is rotatably connected to the second clamping plate;

and/or, the second fixing element comprises a second fixing portion, a first chuck, a second chuck and a fixing screw;

the first chuck is fixedly mounted to the second fixing portion, the second chuck is arranged opposite to the first chuck, and is slidably mounted to the second fixing portion along a direction close to or away from the first chuck, the fixing screw is threaded to the second fixing portion, and abuts against the second chuck tightly.

18. The material testing machine according to claim 1, wherein the first fixing element comprises a first fixing portion, a first clamping plate, a second clamping plate and a driving screw;

the first clamping plate is fixedly mounted to the first fixing portion, the second clamping plate is arranged opposite to the first clamping plate, and is slidably mounted to the first fixing portion along a direction close to or away from the first clamping plate; the driving screw is threaded to the first fixing portion, and the driving screw is rotatably connected to the second clamping plate;

and/or, the second fixing element comprises a second fixing portion, a first chuck, a second chuck and a fixing screw;

the first chuck is fixedly mounted to the second fixing portion, the second chuck is arranged opposite to the first chuck, and is slidably mounted to the second fixing portion along a direction close to or away from the first chuck, the fixing screw is threaded to the second fixing portion, and abuts against the second chuck tightly.

* * * * *